(12) United States Patent
Martin-Cocher et al.

(10) Patent No.: US 8,694,371 B2
(45) Date of Patent: Apr. 8, 2014

(54) SYSTEM AND METHOD FOR VALIDATING METRICS ASSOCIATED WITH INTERACTIVE EVENTS RELATED TO ADVERTISING

(75) Inventors: Gaelle Christine Martin-Cocher, Toronto (CA); Michael Shenfield, Mississauga (CA); Dejan Petronijevic, Mississauga (CA)

(73) Assignee: BlackBerry Limited, Waterloo, Ontario (CA)

( * ) Notice: Subject to any disclaimer, the term of this patent is extended or adjusted under 35 U.S.C. 154(b) by 565 days.

(21) Appl. No.: 12/760,167

(22) Filed: Apr. 14, 2010

(65) Prior Publication Data
US 2010/0287040 A1 Nov. 11, 2010

Related U.S. Application Data

(60) Provisional application No. 61/170,052, filed on Apr. 16, 2009.

(51) Int. Cl.
*G06Q 30/00* (2012.01)
(52) U.S. Cl.
USPC .............. 705/14.4; 705/14.64; 705/14.73
(58) Field of Classification Search
USPC .................. 705/14.4, 14.64, 14.1, 14.73
See application file for complete search history.

(56) References Cited

U.S. PATENT DOCUMENTS

| 7,853,474 B2* | 12/2010 | Ullah ........................ 705/7.31 |
| 2003/0177059 A1 | 9/2003 | Smorenburg et al. |
| 2007/0037521 A1* | 2/2007 | Babut et al. ............. 455/67.11 |
| 2007/0266150 A1 | 11/2007 | Lee et al. |
| 2010/0042504 A1* | 2/2010 | Shenfield et al. ......... 705/14.73 |
| 2010/0211457 A1* | 8/2010 | Martin-Cocher et al. . 705/14.45 |

FOREIGN PATENT DOCUMENTS

CA   2638655 A1   2/2009

OTHER PUBLICATIONS

PCT International Search Report and Written Opinion, PCT/CA2010/000538, Jul. 8, 2010.

* cited by examiner

*Primary Examiner* — Khanh H Le
(74) *Attorney, Agent, or Firm* — Quarles & Brady LLP

(57) ABSTRACT

A method is provided for validating advertising metrics which relate to tracking of interactive events performed by electronic devices. A metric report with an event code that indicative of at least one interactive event performed by an electronic device associated with the network is received. The format of the event code is analyzed to determine whether the event code is consistent with predetermined format rules and the substance of information conveyed by the event code is analyzed to determine whether the event code is consistent with predetermined substance rules. If the event code is determined to be consistent with the predetermined format rules and the predetermined substance rules, the event code is accepted as valid. Otherwise, the event code is identified as being invalid.

3 Claims, 12 Drawing Sheets

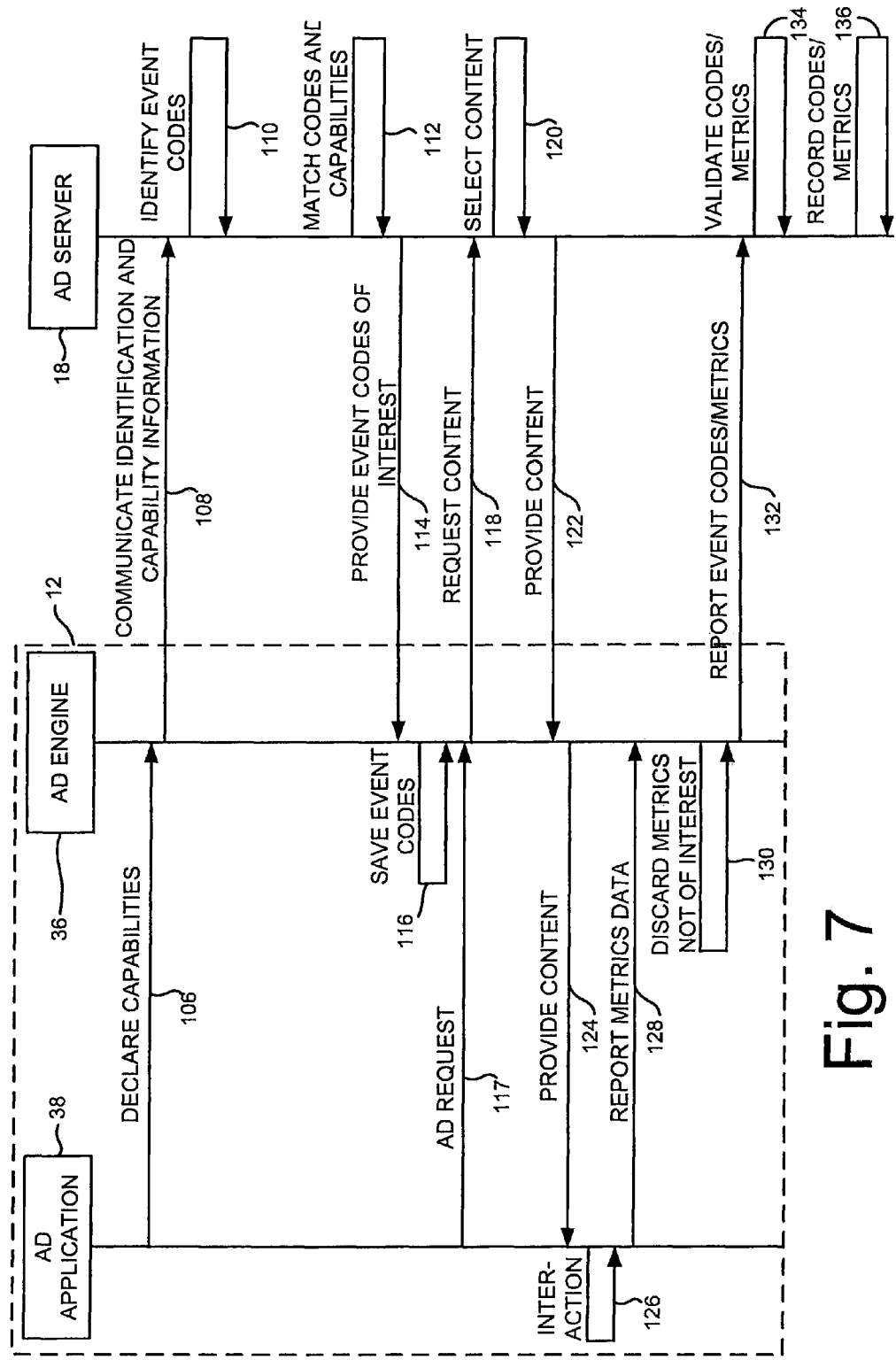

SYSTEM AND METHOD FOR VALIDATING METRICS ASSOCIATED WITH INTERACTIVE EVENTS RELATED TO ADVERTISING

CROSS-REFERENCE TO RELATED APPLICATIONS

This application claims priority to U.S. Provisional Patent Application No. 61/170,052 which has the same title and which was filed on Apr. 16, 2009.

BACKGROUND

The present disclosure relates generally to systems and methods for data communication and, more particularly, to systems and methods for validating data tracking metrics associated with interactive events related to advertisements.

In today's information age, targeted marketing efforts are increasingly tied to electronic communications. To provide customized and targeted advertising, many electronic devices, such as cell phones and personal web-enabled devices, are configured to provide user data to an advertising server or system. An electronic device can, for example, store a user profile that defines the user's interests, demographics, and the like. A web browser running on an electronic device can also track the advertisements viewed by the user and the user's purchase decisions. When properly equipped with a GPS or other location system, an electronic device can also track the user's location. All of this information can be used to provide targeted advertisements for the user. This data can also be used to monitor impressions. For example the data could include information regarding the number of times an advertisement is presented to potential customers and user actions in response to advertisements, such as activations of a "click to" function to access additional information related to an advertisement. Such data can be used to improve or personalize future advertisements or to bill advertisers based on advertisement usage.

In addition to targeted marketing methods, electronic communications are increasingly being used in "viral advertising". Viral advertising is a sophisticated form of "word of mouth" advertising that seeks to exploit existing social networks among individuals by prompting the recipient of an advertising message, encounter, or impression to relay a marketing message to other consumers. In viral marketing, a nucleus target market is identified and then radiates outward in ever-larger marketing spirals. The ease with which messages and information can be forwarded to many individuals from just one member, particularly through the internet, makes viral marketing through electronic communications extremely effective. To maximize the effectiveness of a viral marketing campaign, however, it is desirable to track usage, identify recipients who are most likely to relay marketing messages to others, and then to direct encounters toward these recipients.

In the mobile communications domain, it can be difficult to track advertising. This is true with traditional advertising and, particularly so with respect to viral advertising. For example, because the interactive capabilities of a mobile device application, the transmission of advertising content between consumers may not include all of the interactive capabilities found in advertising content. That is, a "click to email" link provided in advertising content delivered to a mobile device such as a cellular phone that does not have email capabilities cannot be used by the application. Alternatively, a mobile device may include interactive capabilities that are not supported by the content provider. When a mismatch of this type occurs, the ability to transfer the advertising message is hindered, and, in some cases, false tracking data may be acquired.

While a number of tracking metrics are presently available for mobile electronic devices, these metrics do not provide feedback to consistently monitor many types of forwarding and saving operations that are available in electronic communication devices. Conventional tracking mechanisms, moreover, cannot verify the interactive capabilities of either content provided by service providers, or personal communications devices. Known tracking metrics, therefore, are insufficient to maximize the productivity of targeted and viral marketing methods. Furthermore, there is no protocol for verifying any data received from such devices and; therefore, any metrics utilized may be inaccurate or misleading. Not only are inaccurate metrics and data significantly less useful for tailoring and focusing advertising, they may have significant financial consequences, for example, when an advertiser is charged based on inaccurate information.

Therefore, it would be desirable to have a system and method for tracking and verifying interactive events relating to advertisements on mobile devices.

BRIEF DESCRIPTION OF THE DRAWINGS

FIG. 7 is one example sequence diagram setting forth the steps for data flow between an ad application, an ad engine, and an ad server to perform advertising tracking and validation in accordance with the present disclosure;

DETAILED DESCRIPTION

Figure 1:
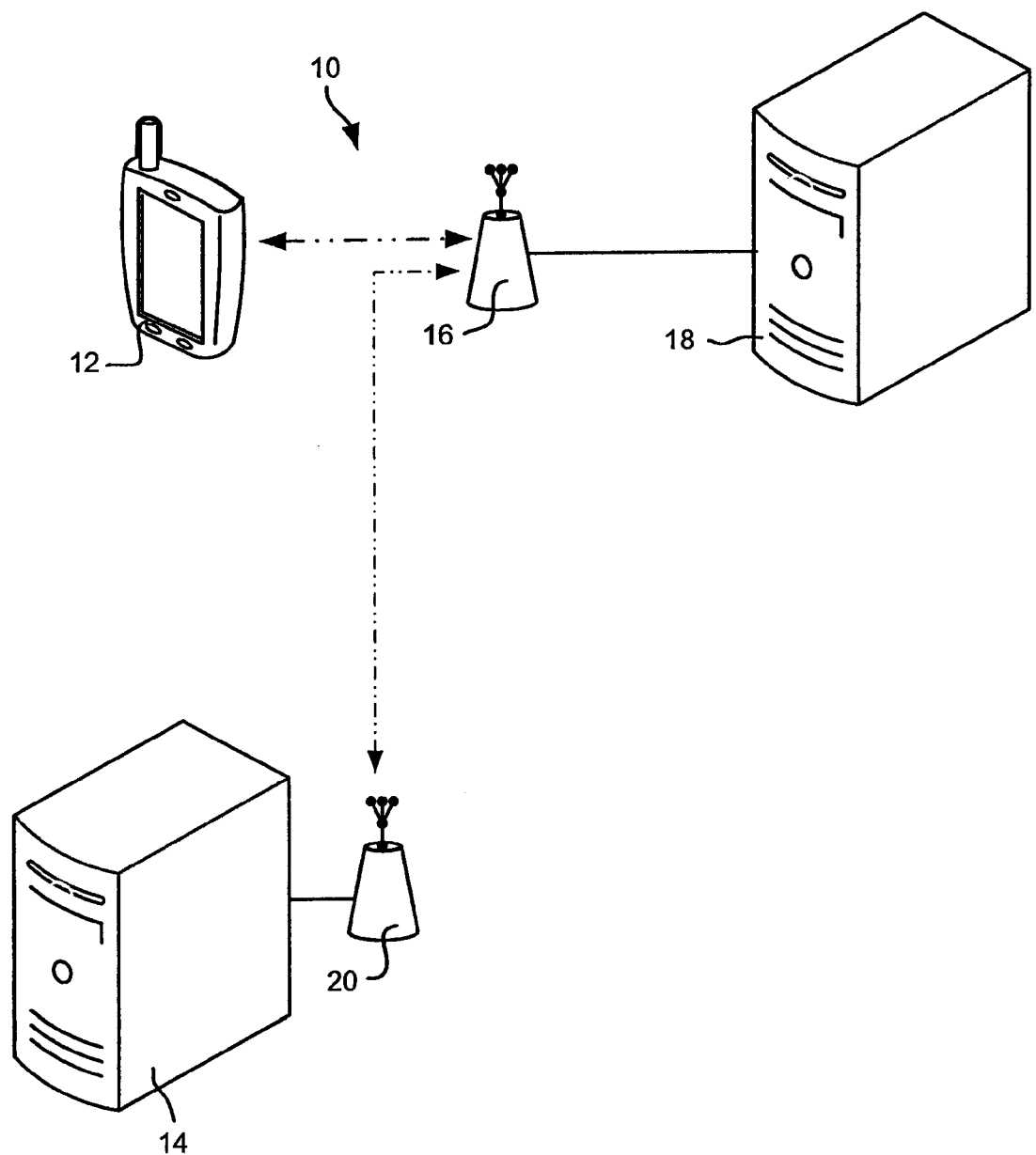
FIG. 1 illustrates an example wireless network incorporating an advertising tracking and validation system in accordance with the present disclosure.

The various aspects of the subject disclosure are now described with reference to the accompanying drawings. It should be understood, however, that the description and drawings are not intended to limit the claimed subject matter to the particular form disclosed. Rather, the intention is to illustrate some of the modifications, equivalents, and alternatives falling within the spirit and scope of the claimed subject matter.

The present disclosure provides a system and method for validating metrics and event codes associated with interactive events related to mobile advertising. In accordance with one aspect of the disclosure, a system is provided for validating feedback related to tracking of interactive events performed by electronic devices associated with a wireless network. An example system includes a network (e.g., wireless or wired) configured to have a plurality of electronic devices associated therewith and a server connected to the network. The server is configured to receive an indication, for example, in the format of an action code or event code, of an interactive event performed by one of the plurality of electronic devices associated with the network. The server analyzes the format of the action code or event code to determine whether the action or event code is consistent with predetermined format rules. Furthermore, the server analyzes a substance of information conveyed by the event code to determine whether the event code is consistent with predetermined substance rules. The server accepts the event code as being valid if the event code is determined to be consistent with the predetermined format rules and the predetermined substance rules.

In accordance with another aspect of the disclosure, a method is provided for validating feedback related to tracking of interactive events performed by electronic devices associated with a network. An example method includes receiving, through the network, an action code or event code indicative of an interactive event performed by an electronic device associated with the network. Thereafter, a format of the event code is analyzed to determine whether the event code is consistent with predetermined format rules. Also, a substance of information conveyed by the event code is analyzed to determine whether the event code is consistent with predetermined substance rules. The event code is accepted as valid if the event code is determined to be consistent with the predetermined format rules and the predetermined substance rules. Otherwise, the event code is determined to be invalid.

Some embodiments include a method comprising the steps of receiving, at an advertising server and from a user device, a metric report that includes at least one of a validation indicator and a validation result indicator and validating data in the metric report if the validation result indicator corresponds to a failed validation which was performed by an advertising engine on the user device.

Other embodiments include a method comprising the steps of including, in a advertising metric report, a validation indicator that indicates whether data in the advertising metric report was validated by an advertising engine on a user device and communicating, from the user device to an advertising server, the advertising metric report.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" is used herein to mean serving as an example, instance, or illustration. Any aspect or design described herein as "exemplary" is not necessarily to be construed as preferred or advantageous over other aspects or designs.

Referring now to FIG. 1, an exemplary communication system 10 includes user agents or electronic devices 12, 14, a wireless access device 16, and an advertising server (ad server) 18. As illustrated, the electronic devices 12, 14 may include internal wireless communications capabilities or may require additional wireless communications hardware 20 to be able to communicate with the wireless access device 16. Thus, the electronic devices 12, 14 can be a wireless device such as a mobile telephone, a personal digital assistant, handheld or laptop computer, a desktop computer, a set top box, a network node, or similar device. Accordingly, various types of wired and wireless communications networks can be used, as will be apparent to those of ordinary skill in the art. While an exemplary system is shown in FIG. 1, it will be apparent that system components may be configured otherwise, for example, including any number of components or various relational interconnections, including, for example, infrastructure networks, ad-hoc networks, peer to peer networks, and the like.

As will be described in detail, the system 10 includes an advertising tracking and validation system. As will be described, the advertising tracking and validation system may be implemented with, for example, an open mobile alliance mobile advertising (OMA MobAd) system. While the following description will be provided with respect to an overall architecture such as may be used in a MobAd context or environment, one of ordinary skill in the art will recognize that the provided description is readily applicable to other systems and architectures. For example, entities referred to as residing on a "sever" or on an "electronic" device could be located elsewhere within other environments and effort will be made to provide examples of such in the following descriptions.

Figure 2:
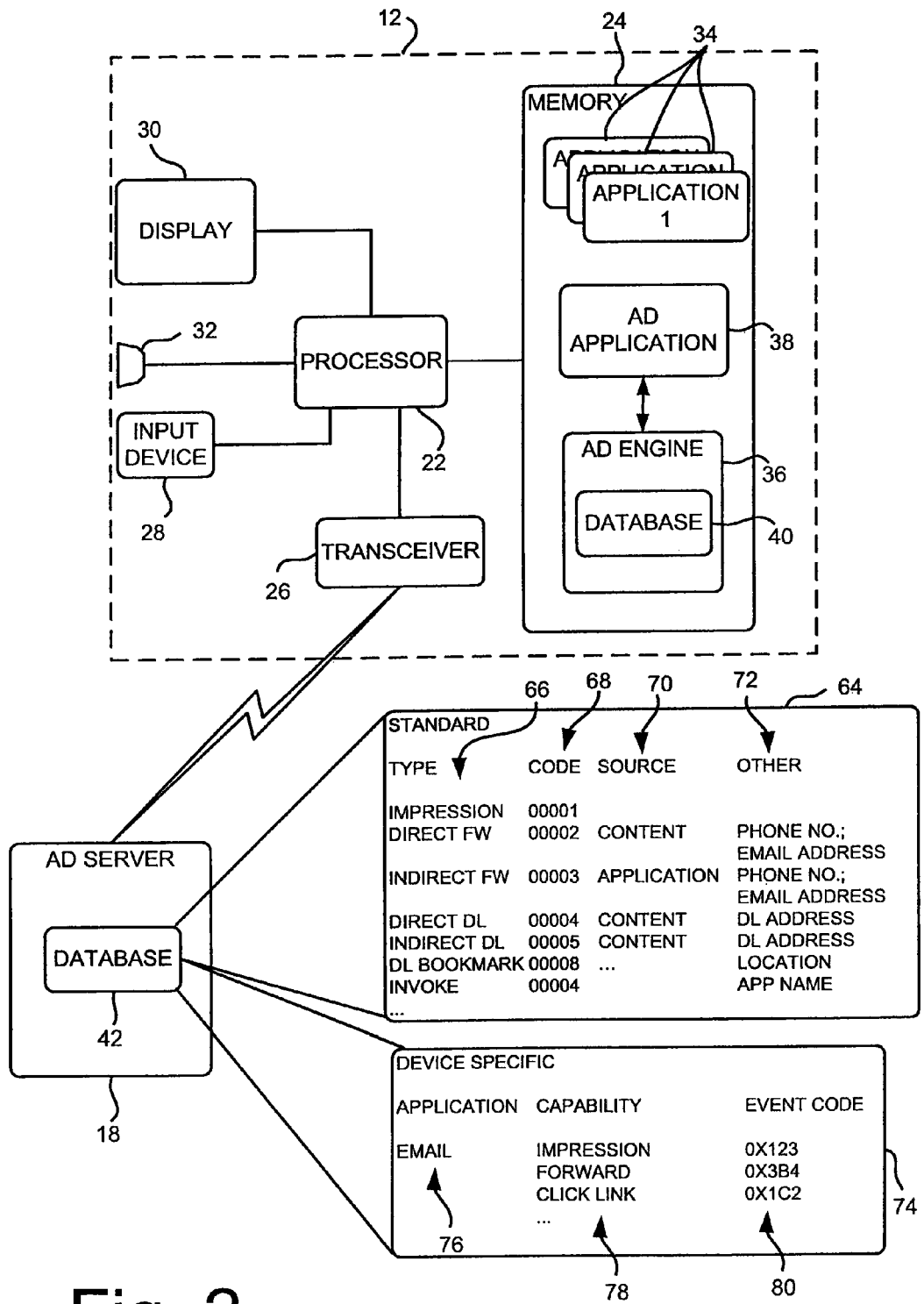
FIG. 2 is a block diagram of an example electronic device and ad server of FIG. 1 for use with an advertising tracking and validation system in accordance with the present disclosure.

Referring now to FIGS. 1 and 2, the electronic device 12 includes a processor 22 linked to a memory 24, a transceiver 26, a user input device 28, an electronic display device 30, and an audio component 32, for example, a speaker. Communications between the electronic device 12 and other components of the system 10 are provided through the transceiver 26. Communications between the user and processor 22 are provided through display 30, audio component 32, and user input device 28.

The processor 22 is capable of running a number of application programs 34, referred to hereinafter interchangeably as applications, programs, or application programs, that are stored in the memory 24. As illustrated, these programs include an advertising engine (ad engine) 36, and an advertising application (ad application) 38. As described above, however, the ad engine 36, for example, may also reside elsewhere, such as the ad server 18. The ad application 38 provides advertisements to the user of the electronic device 12 on user interface devices including electronic display 30, audio component 32, and the like. The ad engine 36 is in communication with both the ad application 38 resident on electronic device 12, and with the ad server 18, through the transceiver 26. In some instances, as will be described, the ad application 38 may also be capable of communicating with the ad server 18. Thus, as will be described, the ad engine 36 can act as a conduit for communicating information to the ad server 18. In addition or alternatively, in at least some cases, the ad application 38 or other applications 34 may be capable of communicating directly with the ad server 18.

In either case, generally speaking, the ad engine 36 obtains appropriate ads from the ad server 18 or elsewhere in the system 10, such as from local storage in the electronic device 12 or from a content server or provider, and works with the applications 34, 38 to communicate those to the user. As a result of the presentation of the ads through the display 30 and/or audio device 32, the electronic device 12 will receive an impression of the ads and may initiate a further interactive event. As will be described, the ad engine 36 receives data relating to the interactive mechanism/event(s), from the ad application 38. Such data received by the ad engine 36 from the ad application 38 is referred to herein as "event data" or "metrics data". Upon receipt of event data, the ad engine 36 can report desired sets of event data to the ad server 18. The ad engine 36 can also provide or facilitate other functions, such as tracking device or application capabilities, aggregating desired sets of event data, and validating event data or desired sets of event data. To this end, the ad engine 36 may maintain a data structure, such as a database 40. Similarly, the ad server 18 may maintain a data structure, such as a database 42. Both databases 40, 42 will be described in detail below.

Figure 3:
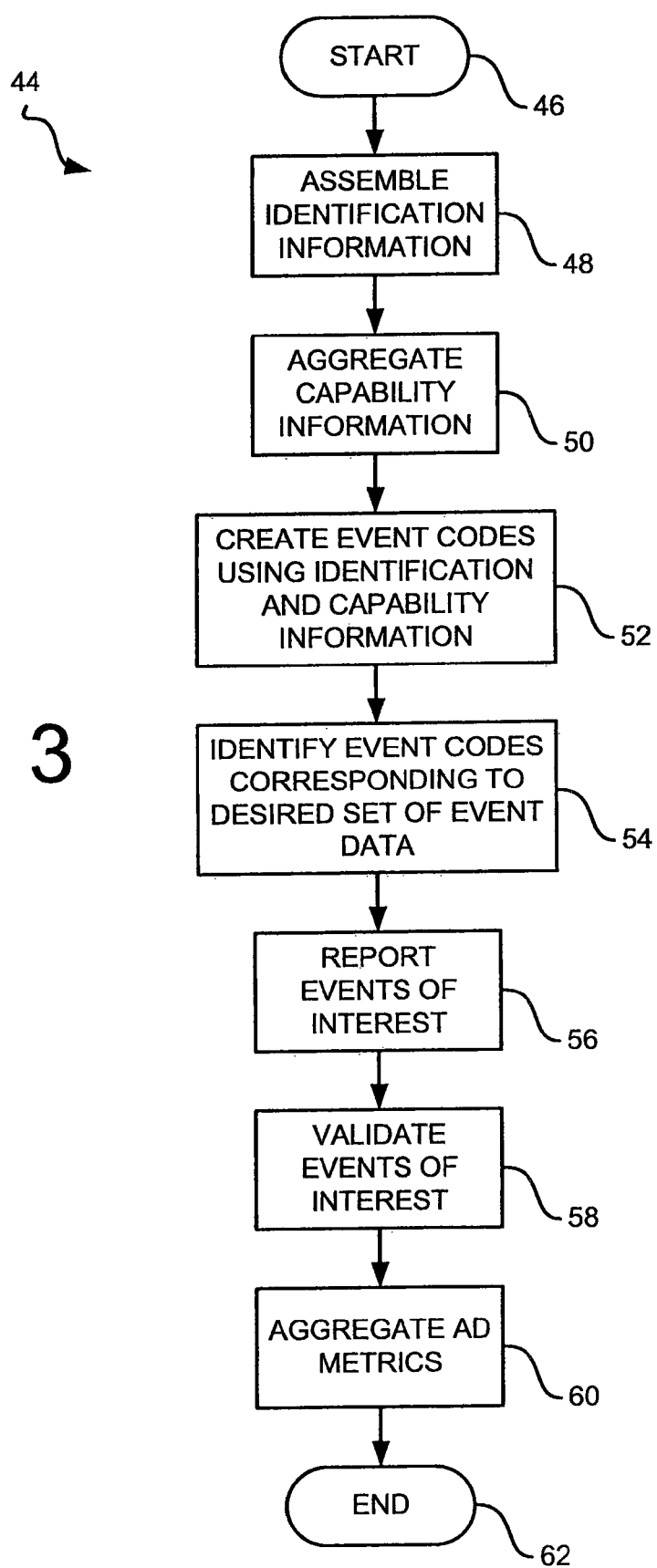
FIG. 3 is a flow chart setting forth steps of an example method for configuring and operating an electronic device and server for use with an advertising tracking and validation system in accordance with the present disclosure.

Referring now to FIG. 3, a high-level flowchart is provided setting forth an overview of example steps of a process 44 for operating an advertising tracking and validation system in accordance with the present disclosure. With respect to FIG. 3, it is noted that the process is described without reference to the entity taking action at a given process block because, as will be explained thereafter, many of the following process blocks represent actions that may be taken by one or more components of the system described above with respect to FIGS. 1 and 2. That is, for example, in one configuration, a given action may be taken or performed by the ad engine 36, whether residing at the electronic device 12 or the server 18 (or residing on both), while in other configurations the given action may be taken or performed by the ad application 38 or the add server 18.

The process 44 begins at block 46 when an electronic device joins a communications network operating an advertising tracking and validation system in accordance with the present disclosure. At process block 48, identification information is aggregated. This identification information may include device identification information, such as the make and model of the electronic device, the serial number of the electronic device, the user of the electronic device, the ad application ID, and the like. As stated above, process block 48 may be achieved through the interaction/cooperation of a variety of entities described above with respect to FIGS. 1 and 2. For example, the ad application 38 may directly communicate identification information to the ad server 18 for storage in the ad server database 42. Alternatively, the ad engine 36 may communicate with or determine the identification information. The ad engine 36 may then store the identification information along with other information in the ad engine database 40. In this case, the ad engine 36 may communicate all or some of the identification information to the ad server 18. As should be apparent, numerous data aggregation and communications protocols may be employed.

Returning to FIG. 3, once the identification information has been aggregated at process block 48, the process continues by aggregating capability information at process block 50. The capability information may include information related to the capabilities of the electronic device, the capabilities of applications residing on the electronic device, and the like. Referring to FIG. 2, like the identification information, the capability information may be communicated by the ad application 38, particularly with respect to information related to the capabilities and limitations of the ad application 38. Additionally or alternatively, some or all of the capability information may be aggregated by the ad engine 36 and communicated or stored in the ad engine database 40. For example, the ad engine 36 may aggregate information related to hardware capabilities of the electronic device, such as the inclusion or lack of a still or video camera, and/or the software capabilities of the operating system of the electronic device or specific applications 34, 38 residing on the electronic device 12. Of course, as stated above, any such capability information may be aggregated by another entity, aggregated ad-hoc, and/or communicated directly from entities having access to the required information. In many cases at least some of the capability information is communicated to the ad server 18 and stored in the ad server database 42. Also, the identification and capability data may be known at registration/provisioning time and are retrieved as opposed to being stored.

Referring to FIG. 3, with all of the identification and capability information aggregated, event codes are generated at process block 52. Event codes may be "basic" or "general" event codes or the event codes may be generated using the identification information and the capability information and, thus, be device-specific event codes. That is, device-specific event codes may be generated that are specific to the electronic device and the capabilities of the electronic device and the applications residing on the electronic device. A general event code could comply with an URI scheme. For instance, ad forwarding via SMS could be coded as "sms:to" forward.

Referring particularly to FIG. 2, the process of generating event codes may be handled by the ad server 18 or may be handled in conjunction/cooperation with or, in some cases, solely by the ad engine 36. Regardless of the particular entity or entities that generate the event codes, the event codes are stored by the ad server 18 in the ad server database 42 and/or the ad engine 36 and, in some cases, may even be communicated to the ad application 38. By way of example, reference is made to the ad server 18 generating the event codes.

The ad server database 42 may include a data structure, such as a database 64 (FIG. 2) that lists the interactive mechanisms and event types. As will be described, multiple types of event codes may be employed. Specifically, as will be described, in some instances general event codes may be used, while in other instances specialized, device- and/or application-specific event codes may be used. In the case of general event codes, a general database 64 is stored in the ad database 42 that correlates a general event type 66 with a general event code 68. The general database 64 may also include corresponding interaction sources 70, which indicate whether and what sources were utilized when the corresponding event 66 occurs, and other parameters 72, which may include any additional information that could be expected with the corresponding event 66. The ad server 18 uses the information stored in the general database 64 and the capability information to identify the event codes that correspond to the interactive events that the electronic device 12 is capable of performing and, later, to validate event codes.

Alternatively, the ad server 18 may generate device- and/or application-specific event codes. In this case, the ad server 18 populates a device-specific database 74 correlating the applications present on the device 76 and the interactive capabilities 78 associated with each application and the device to event codes 80 that are generated specifically for the electronic device 12. It should be readily appreciated that, by generating device-specific event codes using the identification information and capability information, the communication of interactive events to the ad server 18 can be done using only the event code because the device and application information can be determined from the event code using the device-specific database 74. However additional parameters could be expected such as "email address" to which the content was forwarded using the "forward via email" capability. In addition, as will be described, the ad server 18 can validate authenticity of any reports and/or data therein by, for example comparing reported event codes with the device and/or application information.

Returning to FIG. 3, once the event codes have been generated and stored at process block 52, particular event codes corresponding to desired sets of interactive events are selected at process block 54. That is, it should be readily appreciated that not all interactive events will correspond to a useful metric or data point for tracking of advertising. For example, while the advertiser or service provider of the tracked advertising data may find it very useful to know the total number of impressions, or displays, of a particular ad during a period of time, the advertiser or service provider of the tracked advertising data may not find it useful to know the total number of ad content added to a bookmark list in a browser. Rather, the advertiser or service provider of the tracked advertising data may only wish to know when such a bookmark is accessed subsequent to the ad content being added to a bookmark list in the browser. Thus, particular event codes corresponding to the desired sets or subsets of interactive events are selected at process block 54.

The selected or desired sets or subsets of interactive events and corresponding codes are then provided to and used by the appropriate entities to report events of interest at process block 56. As will be described, these reports may occur in a number of different fashions. For example, referring to FIG. 2, the ad application 38 that was involved with the interactive event may report the proper event code directly to the ad server 18. However, it is likely that the ad application 38 may be incapable of communicating directly with the ad server 18 and, thus, the communication of the proper event code is communicated by the ad engine 36. In this case, the ad engine 36 may not report individual event codes, but store the proper event codes associated with each interactive event in the ad engine database 40 to be communicated to the ad server 18 as a report including event codes corresponding to the interactive events that occurred on the electronic device 12 over a given period of time.

When the ad server 18 receives the report, as indicated at process block 58 of FIG. 3, the report may then be validated by, as described above, comparing device-specific event codes and any additional identification information communicated with the event codes to one of the databases 64, 74. If standard event codes are used, the event codes can be validated by at least determining that the communicated event code corresponds to an interactive event that the electronic device 12 and/or application 38 are capable of performing. In this regard, the ad server 18 can disregard any event codes that are inconsistent with the database 64, 74 or that the electronic device 12 and/or application 38 are incapable of performing. Accordingly, the system is capable of detecting fraudulent or otherwise erroneous event codes. As indicated at process block 60 of FIG. 3, the ad server 18 uses the event codes to aggregate ad metrics that speak to the desired sets of interactive events and the process ends at block 62.

As is apparent to one of ordinary skill in the art, the tracking and validation functions could be performed on an electronic device, such that the metrics are validated on device before being sent to the server. If the metrics or the report can be validated on the device itself (e.g., by the ad engine 36), the report could be configured to include an indication, parameter or attribute for indicating whether the metrics were validated. Furthermore, the report could be configured with another indication, parameter or attribute for indicating a result of the metrics validation—that is whether the report, metric(s) or code(s) therein was valid or not. Also, the tracking and validation functions could be bound to the server, such that no validation is performed on the electronic device. Similarly, data used to perform the tracking and/or validation functions may send the metrics directly to the server from an application or the data used to perform the tracking and/or validation functions may be sent through a non-validating proxy on device, such as the ad engine. In addition, the tracking and validation functions may be distributed between the device and the server, such that some tracking and validation is performed on the electronic device and some functions are performed on the server. For example, if the metrics were indicated to be invalid or incorrect, the ad server 18 may perform an additional evaluation of the metrics data. This additional evaluation may be based on information contained in the report, or data known by the ad server 18. Furthermore, in some instances if the report indicates that the metrics were not validated, then the ad server 18 may perform the validation. Thus, the following description provides but some examples of data flows and analysis sequences in one configuration; however, one of ordinary skill in the art will appreciate that many other data flows and analysis sequences are within the scope of the disclosure.

Figure 4:
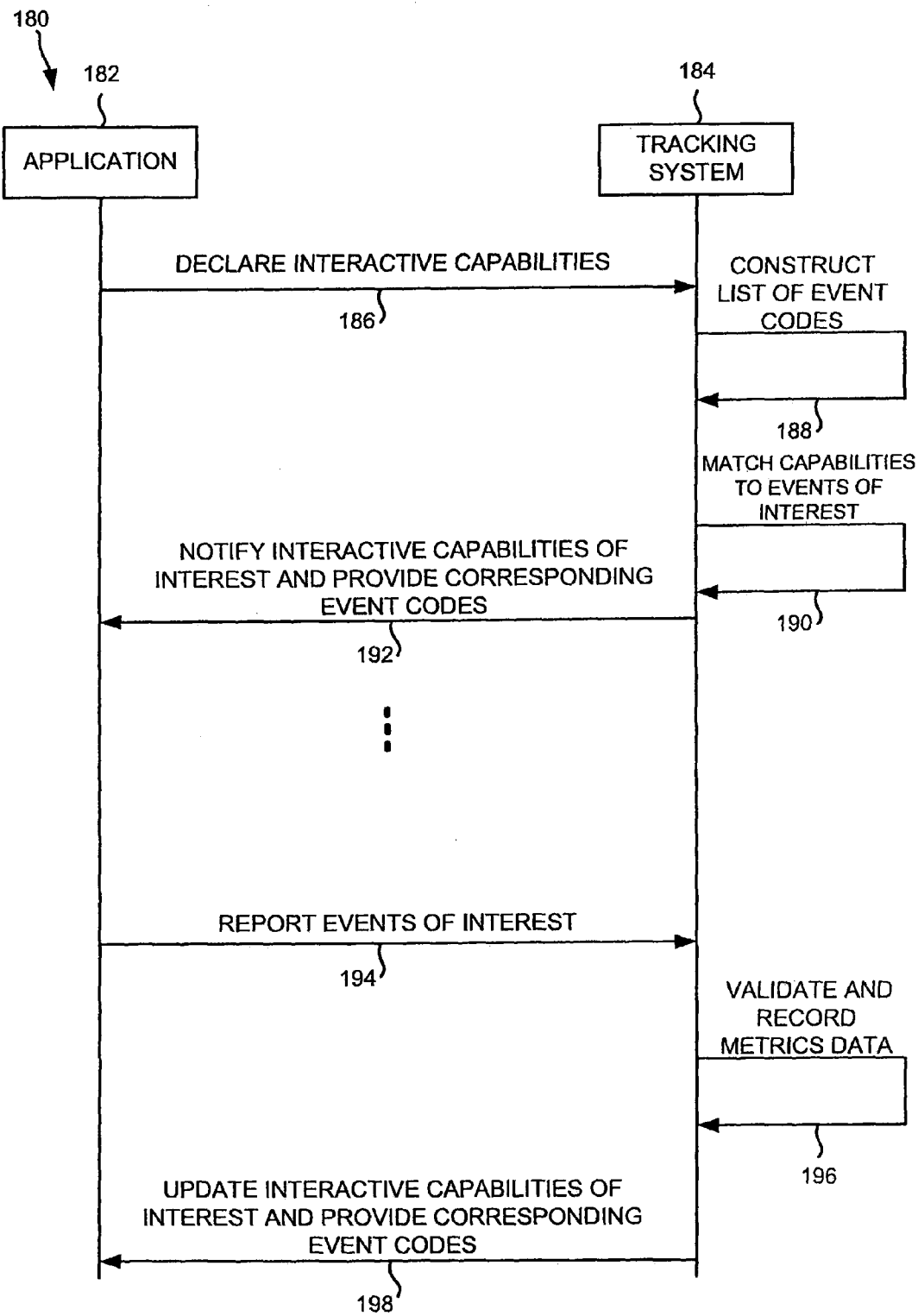
FIG. 4 is a sequence diagram setting forth the steps for data flow between an application and a tracking system of an example advertising tracking system in accordance with the present disclosure.

Turning now to FIGS. 4-7C, some specific sequence diagrams will provide a context for explaining one example implementation of the above-described process. In particular, FIG. 4 provides an example sequence diagram 180 for data flow between an application 182, such as the applications 34, 38 described with respect to FIG. 2, and a tracking system 184. The tracking system 184 is used with respect to FIGS. 4 and 5 to describe the entity or entities involved in tracking interactive events and, for example, may include the ad engine 36 and/or the ad server 18 described with respect to FIG. 2. To this end, the tracking system 184 may physically reside or execute in any of a variety of environments and architectures.

The data flow begins at sequence step 186 with the application 182 declaring its interactive capabilities to the tracking system 184. Responsive thereto, at sequence step 188, the tracking system 184 constructs the list of event codes corresponding to the interactive capabilities communicated by the application 182 and saves the event codes along with the application identification information. At sequence step 190, the tracking system 184 matches the interactive capabilities received from the application 182 to the interactive events that are of interest. Thereafter, at sequence step 192, the tracking system 184 notifies the application 182 of the interactive capabilities of interest and provides the corresponding event codes.

At a later time, which could be after the occurrence of one or more interactive events, the application 182 reports the events of interest, at sequence step 194, whereby the tracking system 184 validates and records the metrics data, at sequence step 196. From time to time, as event codes, events of interest, or even interactive capabilities change, the tracking system 184 updates the interactive capabilities of interest and provides the corresponding event codes, at sequence step 198.

Figure 5:
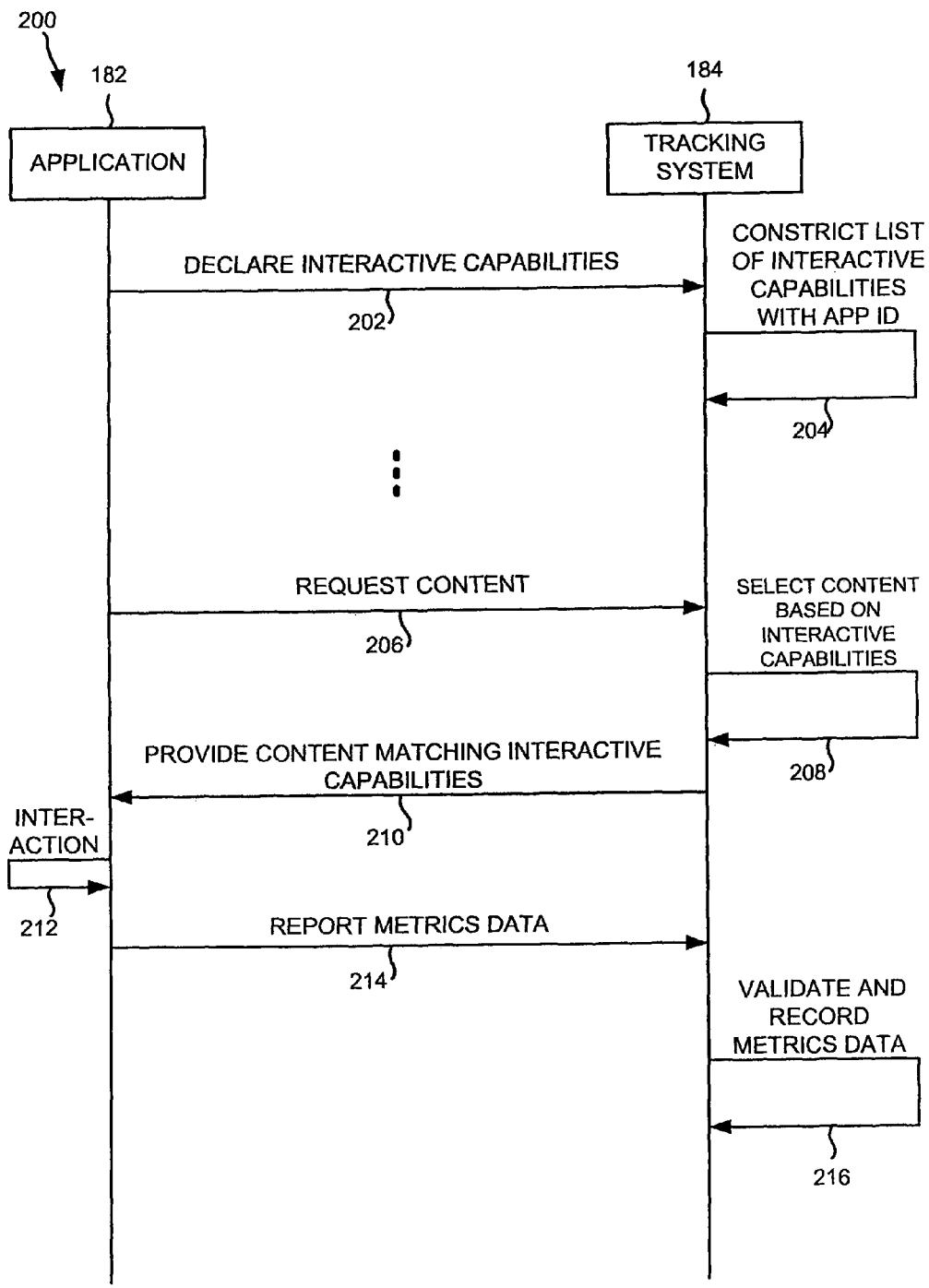
FIG. 5 is a sequence diagram setting forth the steps for data flow between an application and a tracking system during the tracking system providing content to the application of an example advertising tracking system in accordance with the present disclosure.

Turning now to FIG. 5, a sequence diagram 200 setting forth the steps for data flow between the application 182 and a tracking system 184 during the process of providing content to the application 184 is provided. Like the initial process described above with respect to FIG. 4, the application 182 declares its interactive capabilities at sequence step 202. Using the interactive capabilities of the application 182, at sequence step 204, the tracking system 184 constructs the list of interactive capabilities with the identification information of the application 182.

Upon a request for content, such as illustrated at sequence step 206, the tracking system 184 selects the content version using the know interactive capabilities of the application 182 or transforms an existing version of the requested content to a version that is desirable for the known interactive capabilities of the application 182, as shown at sequence step 208. Thus, at sequence step 210, content adapted to the interactive capabilities of the application 182 is provided by the tracking system 184. Using the received content, the application 182 undergoes an interaction at sequence step 212. Thereafter, the application 182 reports metrics regarding the interaction(s) at sequence step 214. The tracking system 184 then validates and records the metrics data at sequence step 216.

As described above, the actions described above with respect to the tracking system 184 may be performed by one or more entities from one or more locations. For example, the data-flow described above with respect to the tracking system 184 may be performed by the ad engine 36 or the ad server 18 of FIG. 2, or a combination of both the ad engine 36 and the ad server 18 of FIG. 2. One example implementation will be provided following hereafter with respect to FIGS. 6, 7, 7A, 7B, and 7C.

Figure 6:
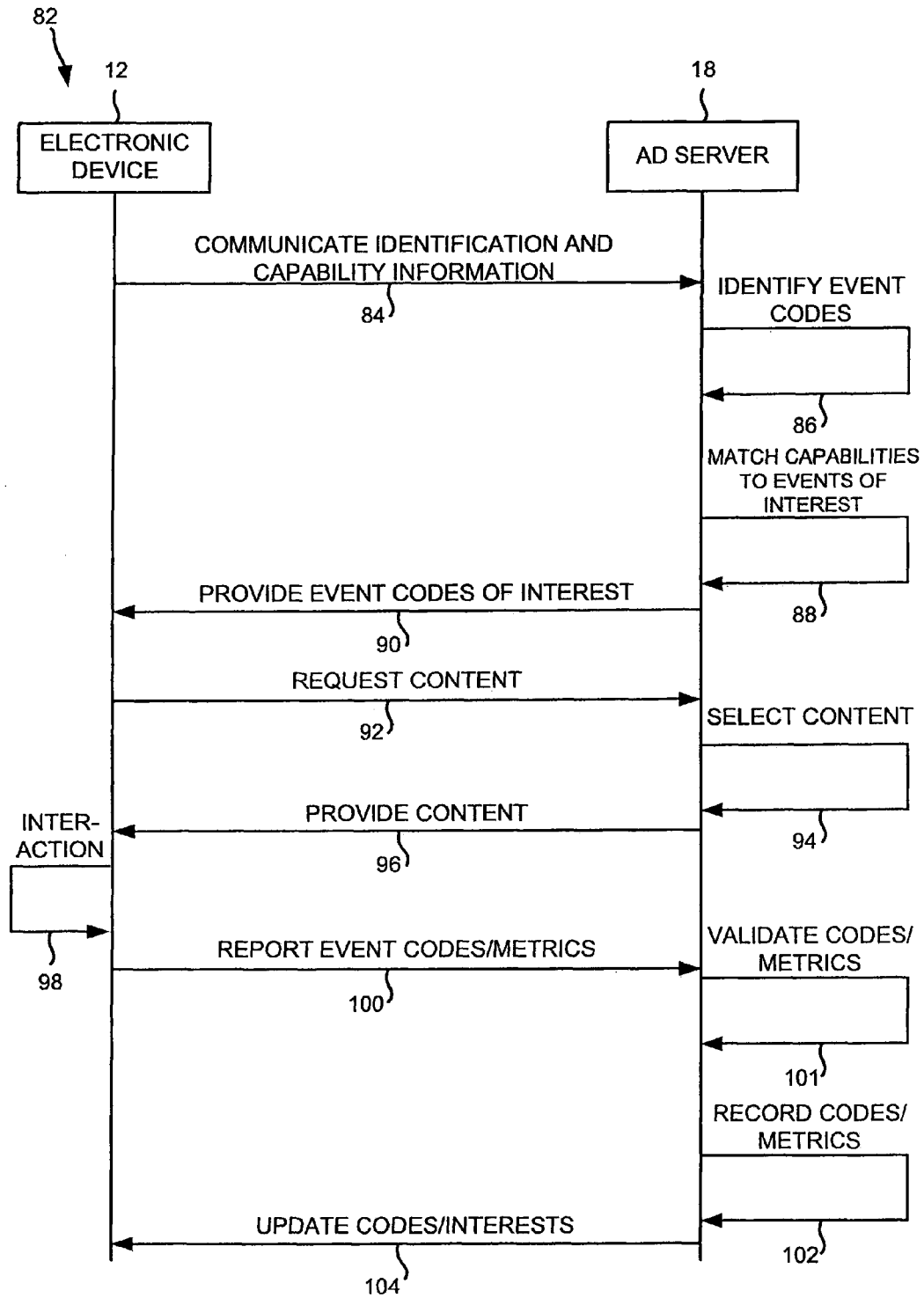
FIG. 6 is a sequence diagram setting forth steps for data flow between an electronic device and an ad server of an example advertising tracking and validation system in accordance with the present disclosure.

Referring now to FIGS. 2 and 6, an example sequence diagram 82 is provided to illustrate the data flow between the electronic device 12 and the ad server 18. It should be noted that, as described above, a given application or the ad engine 36 on the electronic device 12 may be communicating with the ad server 18 to report capabilities and/or event codes. Thus, one of ordinary skill in the art will recognize that, for a given communication between the electronic device 12 and the ad server 18, the entity sending or receiving the communication on the electronic device 12 may vary in some configurations.

When the electronic device 12 registers with the ad server 18, the electronic device (either the application or the ad engine) transmits to the ad server 18 providing both identification information and a list of interactive capabilities at sequence step 84. The following exemplary XML code may be used for such a communication:

```
<supported_events>
    xmlns="http://www.rim.com"
xmlns:xsi="http://www.w3.org/2001/XMLSchema-instance"
xsi:schemaLocation="http://www.com.com interactive_events.xsd">
    <application_id>Mobile Mall</application_id>
    <event_type>Impression</event_type>
```

-continued

```
<event_type>Direct Forward</event_type>
<event_type>Indirect Forward</event_type>
<event_type>Direct Download</event_type>
<event_type>Indirect Download</event_type>
<event_type>Direct Contact</event_type>
<event_type>Indirect Contact</event_type>
<event_type>Store</event_type>
</supported_events>
```

Here, the identification information is an application identifier of "Mobile Mall" and the capability information is communicated as event types of which the application is capable, including providing an impression, permitting a direct forward of the ad, permitting an indirect forward of the ad, allowing direct download of the ad, allowing indirect download of the ad, facilitating a direct contact in conjunction with the ad, facilitating an indirect contact in conjunction with the ad, and storing the ad.

Upon receipt of this data, the ad server 18 constructs a list of event codes that correspond to the interactive capabilities and saves the interactive capabilities and event codes with the application identifier at sequence step 86, such as described above with respect to FIGS. 2 and 3 and, specifically, process block 52. The ad server 18 then compares the list of interactive capabilities to a listing of interactive capabilities of interest at sequence step 88, such as described with respect to FIGS. 2 and 3 and, specifically, process block 54. The ad server 18 then transmits the events of interest and corresponding event codes to the electronic device at sequence step 90. The following exemplary XML code may be used for such a communication:

```
<events_of_interest>
    xmlns="http://www.rim.com"
xmlns:xsi="http://www.w3.org/2001/XMLSchema-instance"
xsi:schemaLocation="http://www.com.com interactive_events.xsd"
<tracking_system_id>Addtracker001</tracking_system_id>
-   <event_mapping>
        <event_type>Impression</event_type>
        <event_code>0001</event_code>
    </event_mapping>
-   <event_mapping>
        <event_type>Direct Forward</event_type>
        <event_code>0002</event_code>
    </event_mapping>
-   <event_mapping>
        <event_type>Indirect Forward</event_type>
        <event_code>0003</event_code>
    </event_mapping>
-   <event_mapping>
        <event_type>Direct Download</event_type>
        <event_code>0004</event_code>
    </event_mapping>
-   <event_mapping>
        <event_type>Indirect Download</event_type>
        <event_code>0005</event_code>
    </event_mapping>
</events_of_interest>.
```

Here, the events of interest are an impression, a direct forward, an indirect forward, a direct download, and an indirect download, and these event types are mapped to general event codes of 0001 through 0005. Although the application is capable of providing direct contact, indirect contact, and store functions, these are not tracked in this example and, therefore, these event codes are not created and/or provided.

As the electronic device 12 is used, requests for content are communicated to the ad server 18 at sequence step 92. It should be noted that although content is described as being provided by the ad server 18, a content server or other server may provide requested content through or independently of the ad server 18. Referring to the example at hand, at sequence step 94, the ad server 18 selects the appropriate content version that is most useful to the electronic device 12 based on the interactive capabilities of the electronic device 12 and the application executing on the electronic device 12. It is noted that the interactive capabilities of the electronic device 12 is just one criterion for ad selection. Other may include user interest, location, topics, and the like. In some cases, the ad server 18 may transform existing versions of ad content in order to provide content versions that are most useful to the electronic device 12. After selecting the appropriate content, the ad server 18 communicates the content to the electronic device 12 at sequence step 96. In an example, if email is not supported by the electronic device 12 or the ad application (or not permitted by the network operator), the ad server 18 may replace email links with URLs to the content provider servers. As another example, a "click to bookmark" link can be embedded in the content, or a "click to indirect forward" link can be removed from the content before sending the content to the application, thereby matching the content to the capabilities of the ad application 38 or of the ad server 18. Although it is mentioned that the ad server 18 may transform content, it should be appreciated that other entities, such as the ad engine 36, may alternatively or additionally handle any transformations or formatting of the content.

At sequence step 98, a user interaction occurs. The user interaction may be receiving and seeing or otherwise consuming the ad content or may include other interactive events like forwarding the ad content. At sequence step 100, event codes and, in some cases, additional data or metrics regarding the interactive events are communicated by the electronic device 12 to the ad server 18. This data may include one or more event codes and any information associated with the event code, in some cases, including some of the metrics data. The following exemplary XML code may be used for such a communication:

```
<event_report>
    xmlns="http://www.rim.com"
  xmlns:xsi="http://www.w3.org/2001/XMLSchema-instance"
  xsi:schemaLocation="http://www.com interactive_events.xsd">
    <application_id>Mobile Mall</application_id>
    <content id = "A123"/>
    <event_code>0002</event_code>
    <interaction_source>Application</interaction_source>
    <invoked_application> BB Messenger </ invoked_application>
    <forward_address>friend@rim.com</forward_address>
  </event_report>
```

As shown here, the interaction source identifies whether the interactive mechanism is provided by the content, for example, as with a hyperlink, or by the application processing the content, for example, by invoking another application like a messenger client. The content could also be specified by its URL or other similar identifier.

As will be described in detail below, at sequence step 101, the ad server 18 may validate the received data. If the received data is found to be valid according to sequence step 101, at sequence step 102, the ad server 12 records the event codes and/or metrics data associated with event codes corresponding to the interactive event of interest. When the set or subset of interactive events of interest change, at sequence step 104, the ad server 12 transmits a new or modified list of interactive events and corresponding event codes, or the decision to delete interactive events of interest and corresponding event codes to the electronic device 12.

As described above, FIG. 6 is described with reference to the "electronic device" 12 communicating with the ad server 18 because the entity on the electronic device 12 communicating with the ad server 18 may vary by device and application. That is, in some instances, the application 34, 38 may communicate directly with the ad server 18, whereas, in other instances, the ad engine 36 communicates with the ad server 18. Referring to FIG. 7, an exemplary sequence diagram is provided that tracks the data flow between the ad application 38 and the ad engine 36 within the electronic device 12 and data flow between the ad engine 36 and ad server 18. In the illustrated example, the ad application 38 is incapable of communicating directly with the ad server 18 and, thus, only communicates with the ad engine 36 and relies upon the ad engine 36 to communicate with the ad server 18.

At sequence step 106, the ad application 38 informs the ad engine 36 of the interactive capabilities of the ad application 38. For example, the ad application 38 may provide an application manifest or application profile and, through a notification, registration, initialization, or other communication process, inform the ad engine 26 of its interactive capabilities. Alternatively, the ad engine 36 deduces ad application capabilities from the ad application ad request message and/or ad application ID. The interactive capabilities of the ad application 38, and likely other applications, are communicated along with identification information at sequence step 108 to the ad server 18. As described above with respect to FIG. 6, the ad server 18 constructs the list of event codes corresponding to the communicated interactive capabilities at sequence step 110 and matches the event codes to interactive events of interest at sequence step 112. The event codes of interest are then communicated to the ad engine 36 at sequence step 114 and the ad engine 36 saves the events codes of interest at step 116. Also, the ad server could construct a list of interactive capabilities and store the list with the ad application. Then the subset list of interactive events of interest and associated code are generated and returned to the ad engine, potentially, with the ad application ID.

At sequence step 117, the ad application requests ad content from, as illustrated, the ad engine 36. However, in some situations, the ad application may be capable of requesting the content directly from the ad server 18. In the illustrated example, at sequence step 118, the ad engine 38 then requests ad content from the ad server 18 and, in response, the ad server 18 selects the appropriate content at sequence step 120 and communicates the content to the ad engine 36 at sequence step 122. Of course, in some cases, the ad engine 36 may already have the ad content and may not need to contact the ad server 18 to request the ad content. For example, the ad engine 36 may be provisioned with the ad content or may have retained the ad content from a previous interaction with the ad server 18. As described above, the ad server 18 may select content or transform content to the proper form based on the capabilities of the ad application 38 or device 12. The ad engine 36 then communicates relevant content to the ad application 38 at sequence step 124, which prompts or otherwise causes a user interaction at sequence step 126. The ad application 38 then reports the metrics data associated with the user interaction at sequence step 128. As described above, the metrics data is composed of the interactive event that occurred during the user interaction at sequence step 126 and associated data. The ad engine then discards metrics data that do not correspond to interactive events of interest and may save the remaining metrics data/events at sequence step 130 for aggregation with other data/events and later reporting to the ad server 18 at sequence step 132 or the reporting to the ad server 18 at sequence step 132 may occur immediately without aggregation and with or without saving.

The information reported to the ad server 18 may take numerous forms. For example, the information reported to the ad server 18 may be a list, document, or data structure of event codes or metric reporting codes. However, as mentioned previously, the information reported to the ad server 18 may include a list of event codes, metric reporting codes, events of interest, data associated with interactive events, and the like. For example, the information reported to the ad server 18 may include phone numbers or emails where ad content was forwarded or other similar information.

Regardless of the information reported to the ad server 18, as will be described in detail below, the ad server 18 may verify the data using a number of verification methods at sequence step 134. For example, if device-specific event codes are utilized, the event codes are checked against the identification and capability information of the device. If valid, the information reported to the ad server 18 by the ad engine 36 is recorded at sequence step 136.

Figure 7A:
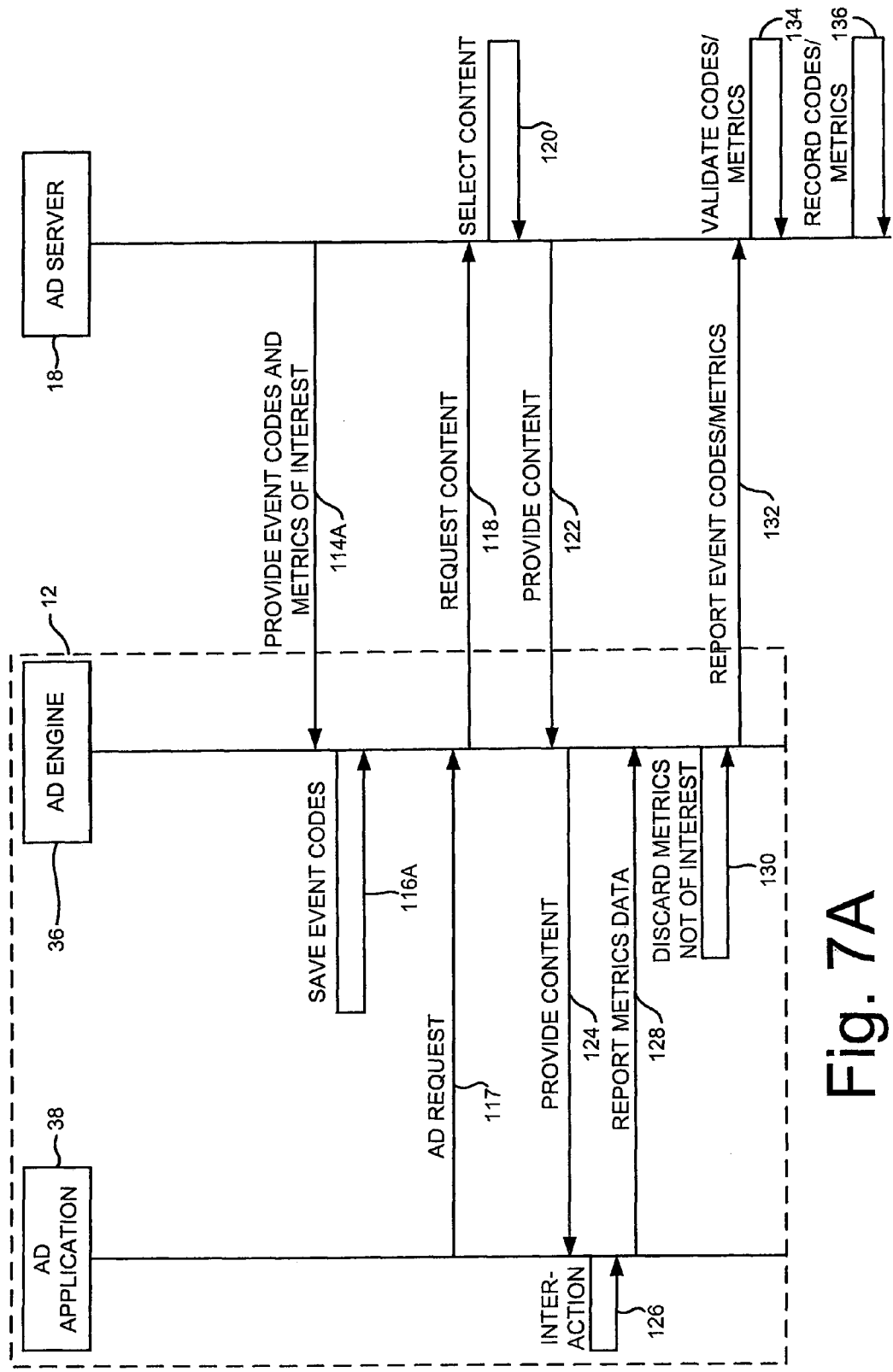
FIG. 7A is another example sequence diagram setting forth the steps for data flow between an ad application, an ad engine, and an ad server to perform advertising tracking and validation in accordance with the present disclosure.

A number of variations of the previously-described sequence steps may be employed in order to accommodate various capability differences between ad applications or to more efficiently utilize resources such as bandwidth usage or processor usage. For example, FIG. 7A shows a variation on the above-described data flow where the interactive capabilities of each ad application are not sent by the ad engine 36 or ad application 38 to the ad server 18. Instead, the ad server 18 provisions the ad engine 36 by sending general event codes and metrics of interest at sequence step 114A. That is, the ad server 18 provisions or otherwise configures the ad engine 36 with a list of event codes and interactive events of interest and associated metric reporting codes at sequence step 114A. The ad engine 36 then stores all events of interest and event codes and metrics at sequence step 116A. The ad engine 36 then receives a request for ad content from the ad application 38 that is coupled with the capabilities of the ad application 38 related to the request for ad content at sequence step 117. Using the metrics data that were reported to the ad engine 36 at sequence step 128, the ad engine 36 discards metrics that are not of interest at sequence step 130 and may save the metrics for aggregation with other metrics and/or immediately report the event codes/metrics of interest to the ad server at sequence step 132.

Figure 7B:
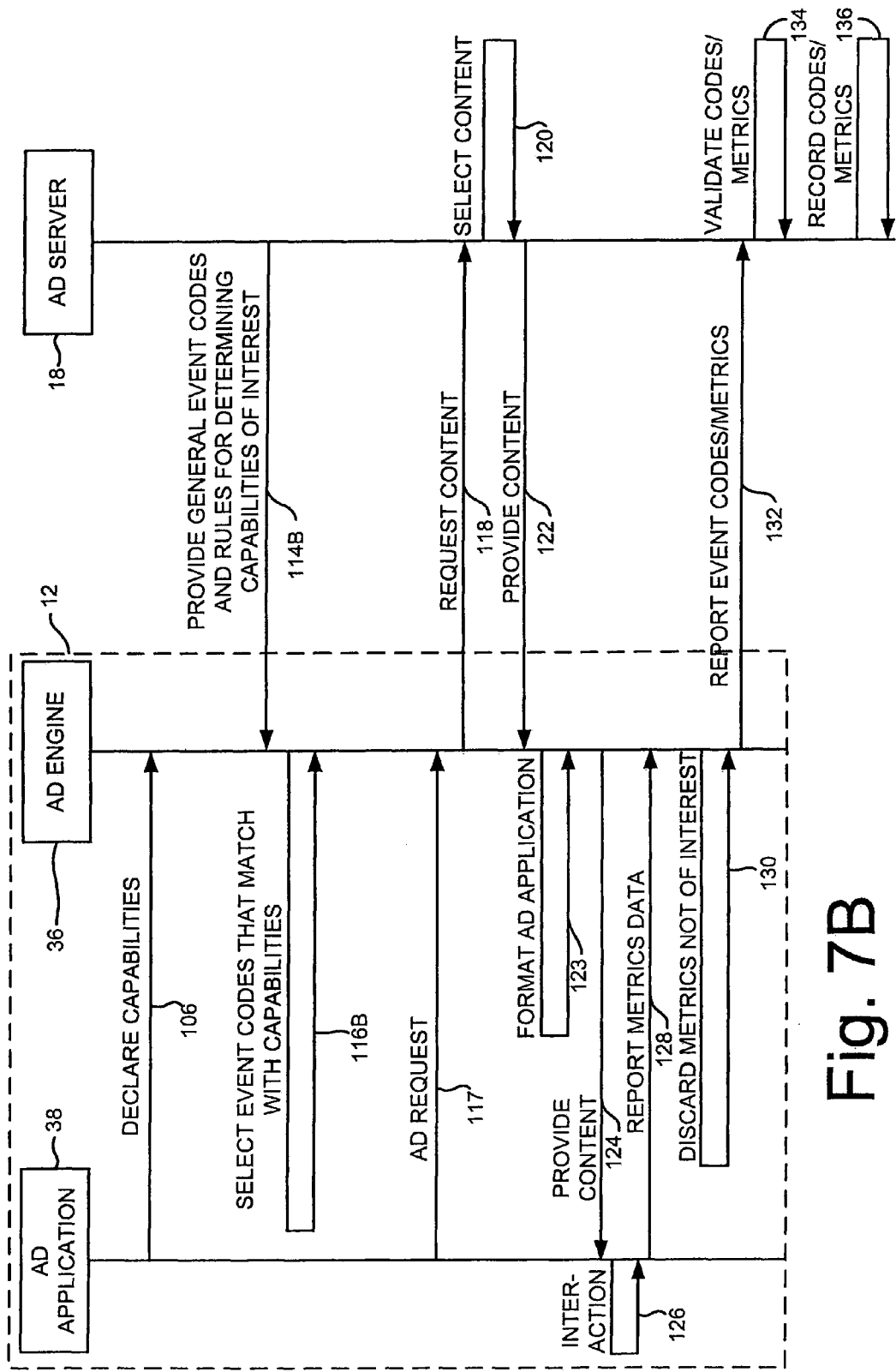
FIG. 7B is yet another example sequence diagram setting forth the steps for data flow between an ad application, an ad engine, and an ad server to perform advertising tracking and validation in accordance with the present disclosure.

Referring to FIG. 7B, in another configuration, the interactive capabilities of the ad application 38 are sent to the ad engine 36 at sequence step 106, but not sent by the ad engine 36 to the ad server 18. Rather, the ad server 18 provisions the ad engine 36 by sending the list of metrics of interest and all general event codes at sequence step 114B. The ad engine 36 uses the list of events of interest and capabilities of the ad application 38 and/or device to select the event codes to utilize at sequence step 116B. Also, within this configuration, because the ad server 18 is not provided with the capabilities of the ad application 38, the ad engine 36 will format the received content or otherwise match the ad content to the abilities of the ad application 38 at sequence step 123.

Figure 7C:
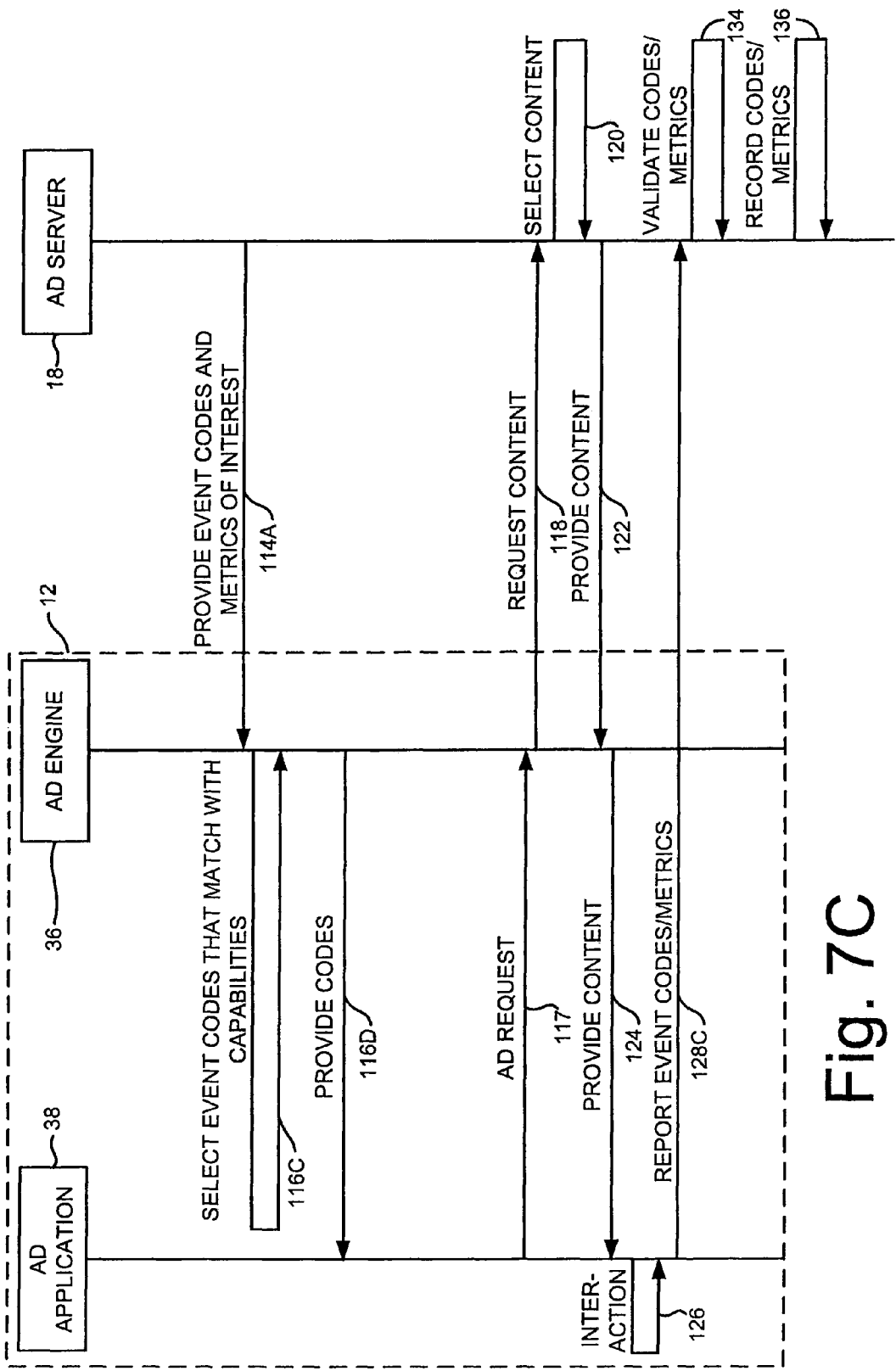
FIG. 7C is still another example sequence diagram setting forth the steps for data flow between an ad application, an ad engine, and an ad server to perform advertising tracking and validation in accordance with the present disclosure.

Referring now to FIG. 7C, in another configuration, ad applications 38 may be capable of retaining and reporting event codes. In this configuration, the ad server 18 provisions the ad engine 36 by sending general event codes and metrics of interest at sequence step 114A. The ad engine 36 may then, if previously notified of the ad application's 38 capabilities, select the event codes that match with the capabilities at sequence step 116C. However, in some configurations, such as when the ad engine 36 is not provided with the interactive capabilities of the ad application 38, sequence step 116C will not be performed. If sequence step 116C is performed, the ad engine 36 provides the events of interest and associated event codes that match the capabilities of the ad application 38 directly to the ad application 38 at sequence step 116D. Alternatively, if sequence step 116C is not performed, the ad engine 36 provides the events of interest and all associated event codes, irrespective of the capabilities of the ad application 38, directly to the ad application 38 at sequence step 116D. As such, following a user interaction at sequence step 126, the ad application 38 reports the appropriate event codes directly to the ad server 18 at sequence step 128C. Again, the data communicated to the ad server 18 may include event codes only or may include raw metrics data and other information.

FIGS. 7, 7A, 7B, and 7C provide a few examples of the numerous variations and implementation changes that may be made within the context of the overall system and methods described with respect to FIGS. 1-6. Thus, it should be readily apparent that numerous other operational variations and/or communications or data flow variations may be employed and within the scope of this disclosure.

As briefly described above, the event codes may be utilized as a verification tool by the ad server to ensure that the reported data is correct and non-fraudulent. For example, when the content includes active content, such as ActiveX, EcmaScript, or Adobe flash routines that may simulate user actions on the tracked content, it is desirable to analyze the metrics provided to limit or prevent false or erroneous actions from being tracked. To provide this verification, the ad server or other entities can include rules and policies for analyzing the event codes and/or metrics before the saving or reporting such.

Figure 8:
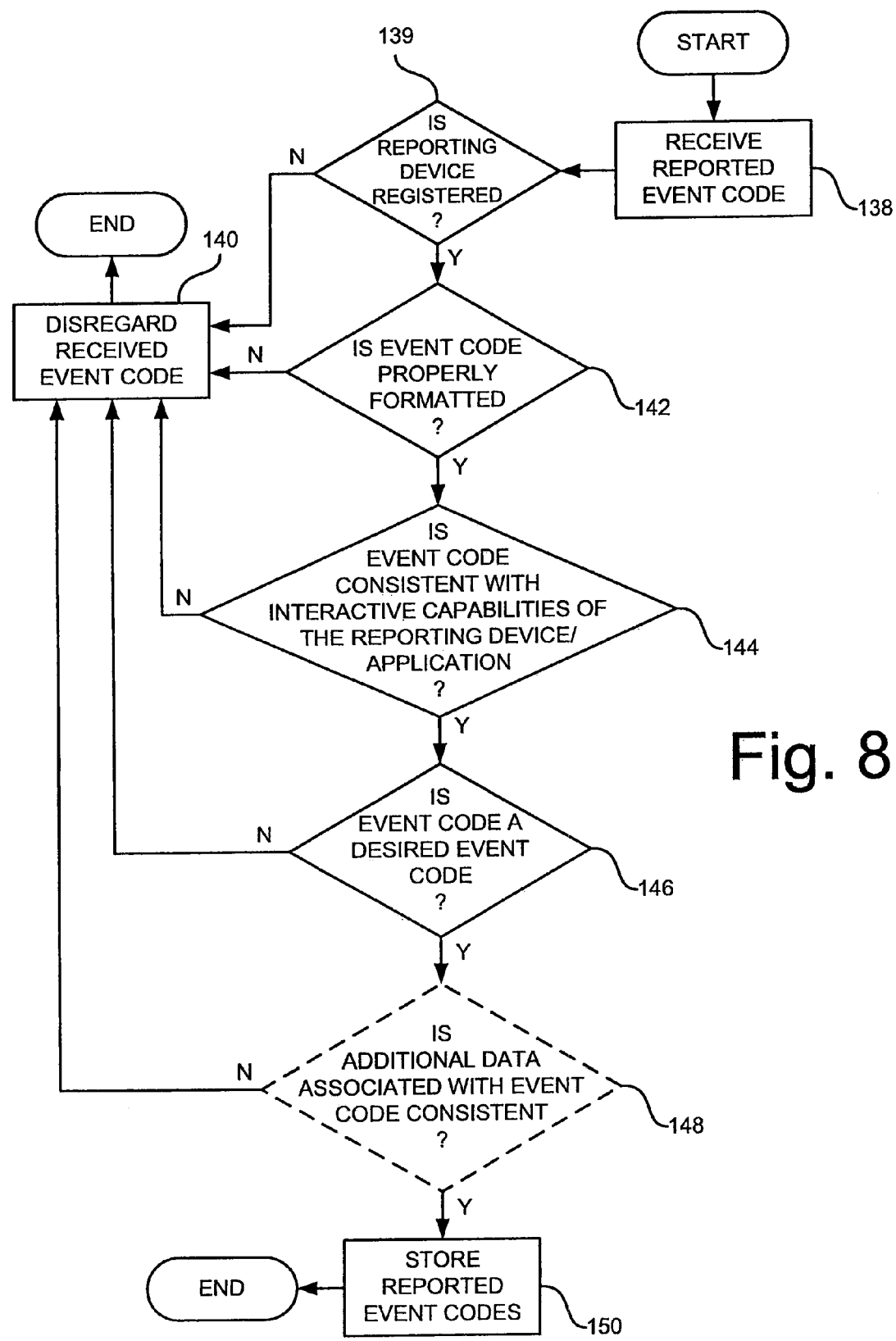
FIG. 8 is a flow chart setting forth steps of an example method for validating data reported within an advertising tracking and validation system in accordance with the present disclosure.

Referring now to FIG. 8, an example verification/validation process begins at process block 138 when the ad server receives an event code. As will be described, the ad server may perform a multi-level verification/validation process. A first level of verification is directed to the format. Specifically, at decision block 139, the ad server determines whether the reporting electronic device has been registered. If not, the event code is disregarded and/or indicated to be invalid at process block 140. If the device is registered, the process continues to decision block 142 where the ad server determines whether the event code is properly formatted. If the event code is not properly formatted, the received event code is disregarded and/or indicated to be invalid at process block 140 and the verification process ends.

However, if the event code is properly formatted, a second layer of verification focused on substance, specifically, the information conveyed by or associated with the event code is undertaken. First, at decision block 144, the ad server determines whether the event code is consistent with the interactive capabilities declared by the electronic device. That is, the ad server determines whether the interactive capability indicated by the event code is one that the electronic device and/or application is capable of performing. If the event code indicates that the electronic device performed an interactive capability that the ad server knows the electronic device or application to be incapable of, the ad server disregards and/or indicates that the event code is invalid at process block 140. However, if the event code is consistent with the interactive capabilities of the electronic device and application, at decision block 146, the ad server proceeds to determine whether the event code is a desired interactive code. That is, the ad server determines whether the event code is consistent with the subset of all event codes corresponding to the capabilities of the device that is desirable to be tracked. If not, the ad server disregards and/or indicates that the event code is invalid at process block 140. However, if the event code is a desired event code, at decision block 148, the ad server may review any data reported along with the event code. It should be noted that while portions of the above-described steps may be omitted in certain cases, for example, if a less robust verification is desired, decision block 148 is indicated as being optional because not all event codes will have associated data that would be usable in the verification process. For example, if the event code corresponds to an impression and no further interactive event, there may be no additional data that can be evaluated. However, for example, if the interactive capability corresponding to the reported event code is a forwarding of the ad content, as will be described in greater detail with respect to FIG. 9, verification using associated data may be performed at process block 148. As with the previous verifications, if the verification at process block 148 fails, the event code is disregarded and/or indicated as being invalid at process block 140. On the other hand; if the additional data is verified, the event code is stored at process block 150 and the verification process ends.

It is noted that the event codes list, of course, could vary by application or change over time. Thus, the verification should be based on the latest updated subset list provided to the application. As such, identification of invalid event codes may be used to identify an application or device that is improperly configured. Accordingly, invalid event codes may be recorded and used to identify errors. For example, the rules for event codes and validation may be provided by the network operator or service provider. Accordingly, the identification of invalid event codes may be used by network operators or service providers to identify improper usage. Alternatively, invalid codes may be disregarded.

Figure 9:
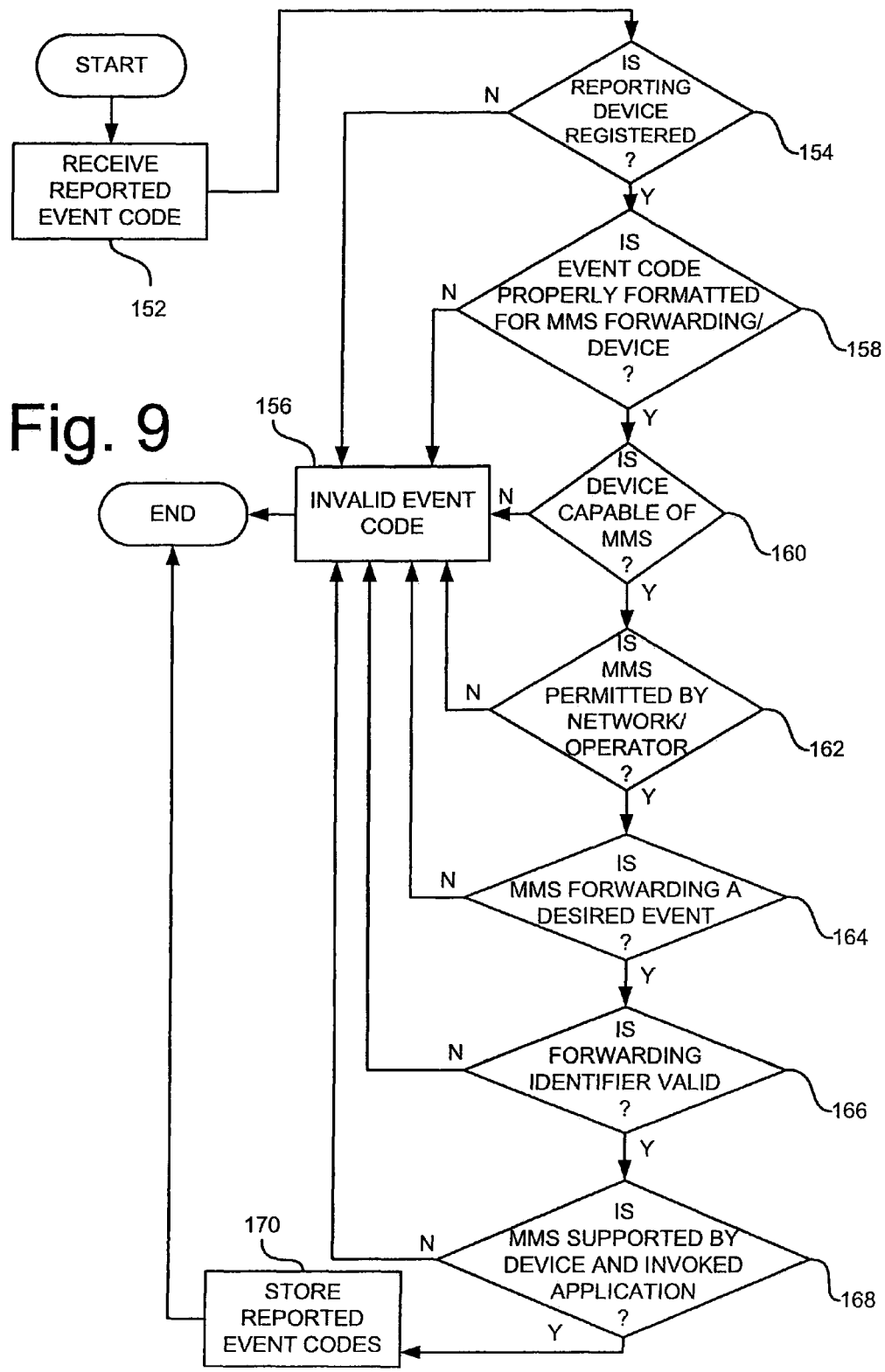
FIG. 9 is a flow chart setting forth steps of an example method of validating data reported within an advertising tracking and validation system in accordance with the present disclosure related to an interactive event of advertising forwarding using multimedia messaging service (MMS) forwarding.

It should also be noted that the validation steps may be performed by entities other than the ad server. For example, it may be advantageous in some embodiments to have the ad engine perform some of the verification steps so as to save communications bandwidth that would otherwise be used sending invalid event codes. In addition, these general steps described with respect to FIG. 8 may vary in type and order based on a particular interactive event, a particular network configuration, a particular network operator, and the like. Referring now to FIG. 9, the steps of an exemplary validation process performed upon receiving an event code related to performing an interactive capability of multimedia messaging service (MMS) forwarding are illustrated. As with the general process described with respect to FIG. 8, the process begins upon receipt of an event code at process block 152, which triggers a check of whether the device has been properly registered with the system at decision block 154. If the device is determined to be improperly registered, the event code is determined to be invalid at process block 156. If the device is determined to be properly registered, the system determines at decision block 158 whether the event code is properly formatted, in this case, for the interactive event of MMS forwarding. If the event code is not properly formatted, the event code is determined to be invalid at process block 156.

At process block 158, the ad server determines if the event code is properly formatted for MMS forwarding. At a minimum, the event code may be evaluated to determine if it corresponds to the interactive event of MMS forwarding. However, in the case of device- and/or application-specific event codes, substantive evaluation of the content of the code and any additional data is may be performed by the ad server or other entity to determine whether the event code is properly associated with the device and the application. If not, the event code is considered invalid at process block 156.

If the event code is determined to be valid in block 158, a check may be made in block 160 to determine if the device is capable of the interactive capability, that is MMS forwarding. This step may be alleviated if device- or application-specific event codes are utilized because, in that case, such a determination would be accomplished at decision block 158. If it is determined that the device is not capable of, in this case, MMS, the event code is determined to be invalid at process block 156.

However, if the event code is not determined to be invalid, at decision block 162, the restrictions of the network or operator are checked to determine if the interactive event, in this case MMS, is permitted. If not, the event code is determined to be invalid at process block 156. However, if MMS forwarding is permitted by the network and/or operator, at decision block 164, the desirability of reporting MMS forwarding is checked. If MMS forwarding is not in the subset of desired event codes, the event code is determined to be invalid at process block 156. If the event code is still appearing to be valid after decision block 154, the additional information associated with the event code is reviewed. In this case, the identifier, such as phone number, to which the MMS message was forwarded is reviewed at decision bock 166 to determine if the format and, in some cases, substance is valid. If the determination is negative, the event code is determined to be invalid at process block 156. However, if the event code is not determined to be invalid, the interactive capability is evaluated at decision block 168. For example, if the original ad content was delivered via text message, the capabilities of the text messaging client are evaluated to determine if the text messaging application is capable of forwarding texted content through the MMS application or forwarding texted content directly as an MMS message. If not, the event code is determined to be invalid at process block 156. However, if this and the preceding determinations are passed, the event is considered to be valid and is stored at process block 170.

Again, it should be recognized that the order of format and content evaluation described above with respect to FIGS. 8 and 9 is exemplary only. That is, format and substantive evaluations may be conducted in any order or evaluations within the format considerations and the substantive considerations may be changed.

The particular configurations disclosed above are illustrative only, as the disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosure.

For example, although specific components are described above as associated with the electronic device 12 or ad server 18, it will be apparent in a network environment that these functions can be provided in any location on the network. Furthermore, although no specific mobile environment is described, it will be apparent that the disclosure can be applied in many different network environments. That is, the above-described systems and methods have been described in general terms; however, this general description may be readily implemented in a variety of environments without departing from the above disclosure. However, one will readily recognize that the roles of some or all of the above-described entities, particularly, the ad application 38, the ad engine 36, and the ad server 18 may vary. One exemplary system where the present disclosure can be readily extended is into an open mobile alliance (OMA) mobile advertising (MobAd) environment. It may be appreciated that the content provider may also be a content delivery provider, such as an ad network, a content façade, such as an OMA broadcast services enabler suite (BCAST) or an OMA Dynamic Content Delivery (DCD) enabler. In this way the content provider undertakes some of the roles described above as being performed by the ad server 18, such as the selection of relevant or targeted content.

Additionally, although event codes are discussed above, it will be apparent that the interactive capabilities and interactive events can be determined directly from XML code, and that the event codes are not required in all applications. Thus, the disclosure is to cover all modifications, equivalents, and alternatives falling within the spirit and scope of the disclosure as defined by the following appended claims.

What is claimed is:

1. A method executed by an advertising server device, comprising:
    receiving, at an advertising server and from a user device, an electronic message containing a metric report that includes a validation indicator, a validation result indicator and a code indicative of an interactive event that was performed by the user device; and
    validating by the advertising server data in the metric report when the validation result indicator corresponds to a failed validation which was performed by an advertising engine on the user device, wherein validating includes sub-operations of:
        analyzing the metric report to identify the code indicative of the interactive event that was performed by the user device, and
        comparing the interactive event to a list of interactive capabilities of the user device, where the list of interactive capabilities includes a hardware capability of the user device or a software capability of an operating system of the user device.

2. The method of claim 1 wherein validating further includes a sub-operation of analyzing the code according to a rule.

3. The method of claim 2 wherein analyzing the code comprises:
    analyzing a format of the code to verify whether the code is consistent with predetermined format rules;
    analyzing a content of information conveyed by the code to determine whether the code is consistent with predetermined substance rules; and
    accepting the code if the code is determined to be consistent with the predetermined format rules and is determined to be consistent with the predetermined substance rules.

* * * * *